United States Patent
Robinson (12)

(10) Patent No.: US 6,351,638 B1
(45) Date of Patent: Feb. 26, 2002

(54) METHOD AND APPARATUS FOR ACCESSING A PLURALITY OF COMMUNICATION NETWORKS

(75) Inventor: William Robinson, Farnham (GB)

(73) Assignee: Motorola, Schaumburg, IL (US)

( * ) Notice: Subject to any disclaimer, the term of this patent is extended or adjusted under 35 U.S.C. 154(b) by 0 days.

(21) Appl. No.: 09/180,791

(22) PCT Filed: May 20, 1997

(86) PCT No.: PCT/EP97/02550

§ 371 Date: Mar. 15, 1999

§ 102(e) Date: Mar. 15, 1999

(87) PCT Pub. No.: WO97/44975

PCT Pub. Date: Nov. 27, 1997

(30) Foreign Application Priority Data

May 17, 1996 (GB) .............................................. 9610424

(51) Int. Cl.[7] .................................................. H04M 3/00
(52) U.S. Cl. ...................... 455/418; 455/419; 455/420; 455/557; 455/422
(58) Field of Search ................................. 455/418, 419, 455/422, 558, 426, 524, 525, 556, 557, 420

(56) References Cited

U.S. PATENT DOCUMENTS

| 5,249,218 A | * | 9/1993 | Sainton ........................ 379/65 |
|---|---|---|---|
| 5,655,003 A | * | 8/1997 | Erving et al. ................ 379/418 |
| 5,657,371 A | * | 8/1997 | Suomi et al. ................ 455/418 |
| 5,881,235 A | * | 3/1999 | Mills ...................... 395/200.51 |
| 5,943,616 A | * | 8/1999 | Andersson ................... 455/422 |
| 5,974,310 A | * | 10/1999 | Bilgic ......................... 455/418 |
| 5,983,101 A | * | 11/1999 | Billstrom .................... 455/426 |
| 6,101,398 A | * | 8/2000 | Joong et al. ................ 455/557 |

FOREIGN PATENT DOCUMENTS

| GB | 0562890 | * | 9/1993 | ................ 455/31.1 |
|---|---|---|---|---|
| GB | 2294844 | * | 9/1993 | ................ 455/37.1 |

* cited by examiner

Primary Examiner—Daniel Hunter
Assistant Examiner—Lana Le

(57) ABSTRACT

A method enables a subscriber unit (20) to access a common communication system to communicate with a selected communication system. The subscriber unit receives (404) an indication of any communication systems available in a geographic region associated with the common communication system and requests access to the selected communication system. After receiving (506) an enabling program for the selected communication system, the subscriber unit transfers (508) the enabling program to an external processing device. A novel subscriber unit (20) and external processing device (24) are also described.

9 Claims, 5 Drawing Sheets

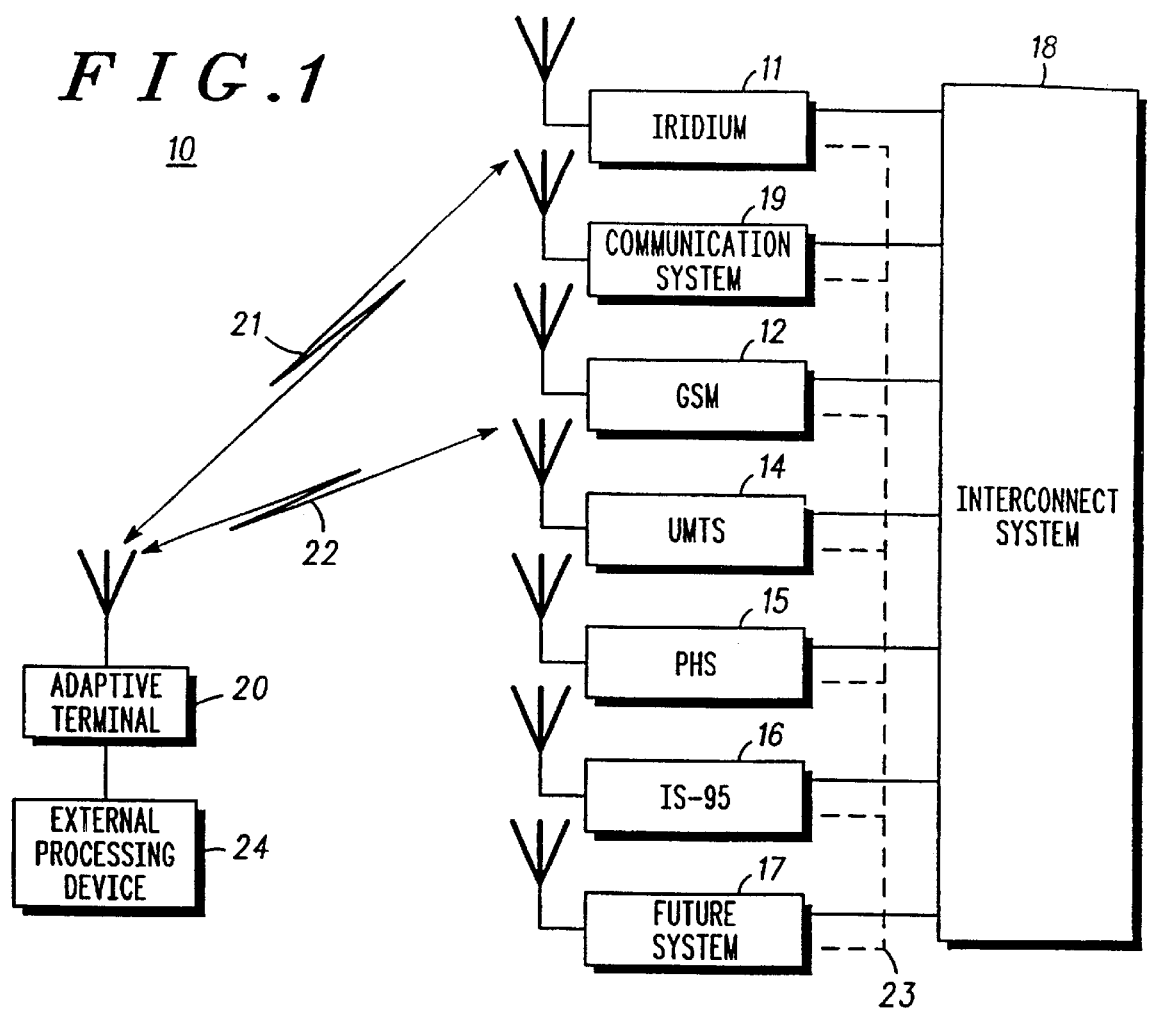
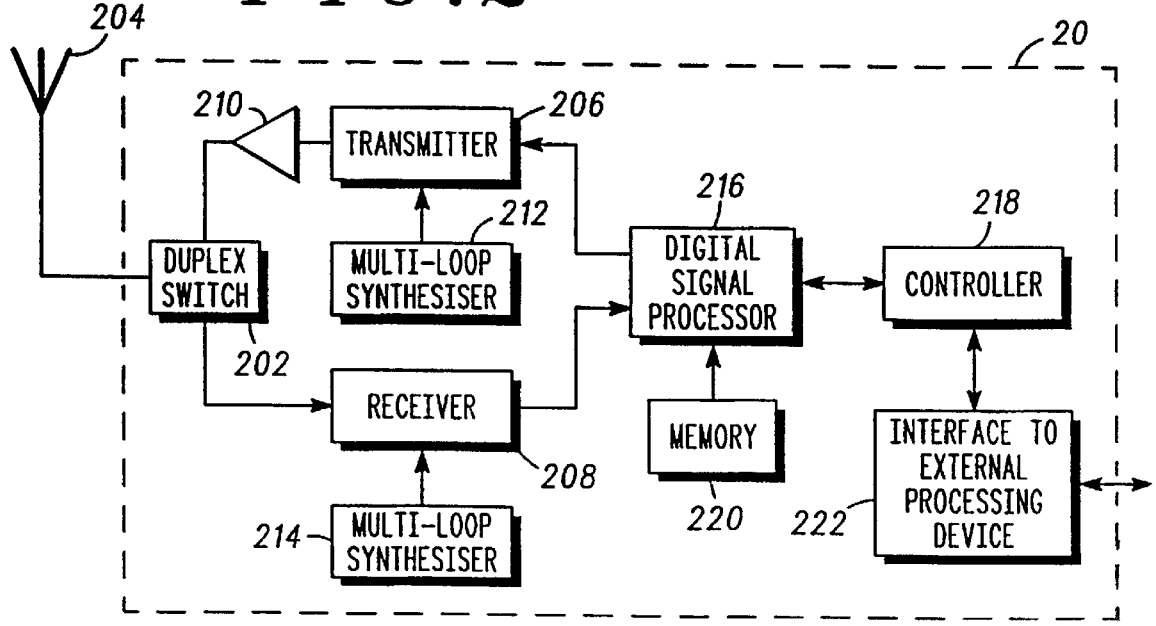

METHOD AND APPARATUS FOR ACCESSING A PLURALITY OF COMMUNICATION NETWORKS

FIELD OF THE INVENTION

The present invention is generally related to communication devices and systems, and more particularly, to a method and apparatus accessing a plurality of communication networks.

BACKGROUND OF THE INVENTION

Within the past several years, the number of radio frequency (RF) communication systems has grown from a small number of systems, each available for one type of function, to a vast number of potential systems available for providing the same type of basic services. Since the introduction of the Nordic Mobile Telephone (NMT) system, newer analogue systems have been introduced, such as Total Access Communication System (TACS), and, more recently digital systems such as the Global System for Mobile communications (GSM), DCS-1800 (Digital Cellar System), CT-2 (Cordless Telephone), and DECT (Digital European Cordless Telephone) systems. Further, there are considerable numbers of systems each serving a specific customer service demand such as the European Radio Messaging System (ERMS) for paging and Ministry of Posts and Telecommunications standard MPT 1327 (A Signalling Standard to Trunked Private Land Mobile Radio Systems) for private mobile radio applications. These systems often overlap in their coverage areas. Thereby giving users an option as to which system to select.

There is also a proliferation of new systems being developed, such as the American Digital Cellular (ADC), referred to as Interim Standard 54 (IS-54), and a Personal Digital Cellular (PDC) standard being developed in Japan, referred to as the RCR (Research & Development Centre for Radio Systems) standard 27. There is also a Code Division Multiple Access (IS-95) system being developed as a higher capacity/higher quality alternative to the existing systems. In addition to what is normally considered cellular, there are a number of Personal Communication Systems (PCS) and wireless local loop systems being developed that are all competing for customers. Some of these systems will be based on existing protocols (such as the DCS-1900 (Digital Cellular System) being based upon GSM). Also, some previous land mobile trunking systems offer dial-up telephony services. One future system currently under design is the Future Land Mobile Public Telephone System (FLMPTS).

One problem for the end user is that to be able to go anywhere in the world and use a mobile telephone, the user would need to carry a dozen or more telephones since one unit will not operate on all of the systems. In addition, even within the same system, the mobile owned by a user may have limitations built in during its original programming that prevent it from using features subsequently developed for a particular system. While there are some adaptive terminals available today that can be returned and reprogrammed (either electronically or by replacing some of the memory devices containing the programming), the user often finds themselves with an adaptive terminal that has become obsolete in just a short time.

As set forth in a patent application given serial number GB2294844 published in Great Britain on May 8, 1996, an adaptive terminal is described to enable communication by a single mobile terminal with more than one network. The mobile terminal receives from a common communications system information regarding the availability of other communication systems within the common communications system coverage area. The mobile terminal then selects one of the communications systems and receives enabling programming from the communication system. The enabling programming permits the adaptive terminal to configure itself to operate on the selected communication system.

However, such an adaptive terminal increases the memory and processor power required to be resident in the adaptive terminal, particularly if the terminal is required to compile, link and load new software in a reasonable period of time. These concerns may be particularly significant for small more simple shirt pocket sized terminals.

Accordingly, there is a need for a method and apparatus to reduce cost and complexity in a mobile unit adapted to communicate with multiple networks.

BRIEF DESCRIPTION OF THE DRAWINGS

FIG. 1 is a block diagram of a communication network according to the present invention;

FIG. 2 is a block diagram of an external processing device according to the present invention;

DETAILED DESCRIPTION OF THE INVENTION

Figure 3:
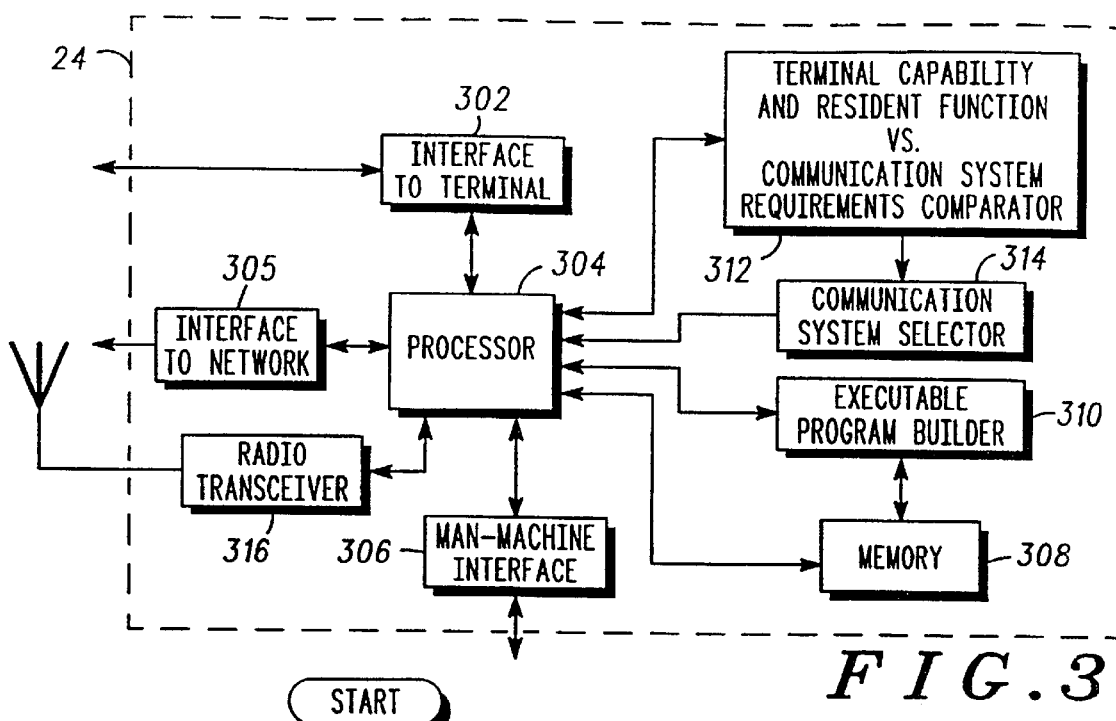
FIG. 3 is a flow chart showing the performed steps for determining whether a terminal is compatible with a particular system.

Referring to FIG. 1, a block diagram of a network 10 utilising the present invention is illustrated. In network 10, there are a plurality of communication systems 11–17 all coupled through an interconnect system 18 to a common communication system 19. Interconnect system 18 would potentially be a wireline system, such as an Integrated Services Digital Network (ISDN). The systems may also be directly connected along line 23 by way of a landline network, for example. In FIG. 1, an adaptive terminal 20 is seeking access to one of the communication systems in network 10. The adaptive terminal could be any wireless communication device, including cellular telephones, pagers, personal digital assistants, etc. To accomplish this access, adaptive terminal 20 will first access common communication system 19 using a channel 21. Common communication system 19 will reply to adaptive terminal 20 with a list of systems available for use in network 10. Along with the list of available systems, system 19 may also provide information regarding types of features available and system costs. Alternatively, common communication system 19 could be incorporated in one of the other available systems.

FIG. 1 further illustrates an external processing device 24 connected to a mobile phone (e.g. a GSM handset) via a cable (e.g. a connection via PCMCIA). Alternatively, this connection could be made by an infrared (IR) link, or some other wireless link. A laptop computer or other suitably equipped peripheral could be employed as an external processing device to implement the present invention. This configuration allows the functionality of the external processing device to be exercised while accessing information in a wireless fashion. As will be described in more detail in reference to the remaining figures, adaptive terminal 20 will coordinate with the external processing device to enable communication with a selected communication system. Adaptive terminal 20 will then open a channel 22 with the selected communication system, in this case Universal Mobile Telecommunication System (UMTS) 14.

Turning now to FIG. 2, a general block diagram of adaptive terminal 20 is illustrated. Adaptive terminal 20 has the typical duplex switch 202 for coupling antenna 204 to transmitter 206 and receiver 208. Transmitter 206 is coupled to duplex switch 202 through an amplifier 210. Transmitter 206 and receiver 208 each have multi-loop synthesisers 212 and 214, respectively. Synthesisers 212 and 214 permit adaptive terminal 20 to operate at different frequency ranges. It should be noted here, that while adaptive terminal 20 is meant to be a generic, programmable type of radiotelephone, it is not necessarily meant to work in every possible system. Adaptive terminal 20 further consists of a digital signal processor (DSP) 216, a controller 218, a memory 220, and an interface 222 to external processing device. Some of the functions may be resident in adaptive terminal 20. For resident functions, the executable code will be retrieved from a memory 220, which may, if preferable, be physically located in DSP 216 or controller 218. Interface 222 could be an RS232 interface, an IR interface, or some other interface to enable communication between the adaptive terminal and the external processing device.

Turning now to FIG. 3, a functional block diagram shows the external processing device 24. The external processing device preferably includes an interface 302 coupled to receive information from the mobile terminal or another network such as the wireline interconnect system 18. Interface 302 is coupled to a processor 304 which may also receive information from an interface 305 adapted to interface to a network. Interface 305 could be for example a modem or a cable interface. Processor 304 may also receive commands or other information from a man machine interface 306. External processing device 24 also includes a memory 308 coupled to the processor and an executable programme builder 310. The executable programme builder transmits a programme to the terminal by way of the processor and interface dependent upon the terminal capability and resident functions. A comparitor 312 compares the terminal capability and resident function, for example tuning range, channel bandwidth limitations and maximum transmit power, versus the communication system requirements to determine whether the mobile terminal is able to communicate on a particular system. A communication system selector 314 responds to the comparitor to select a particular system. Alternatively, the external processing device could include a radio transceiver 316 to receive information from the network.

The present invention enables an external processing device to reduce the cost and complexity of the adaptive terminal. The adaptive terminal adapts to different air interfaces with the aid of an external processing device. Preferably, the external processing device enables compiling linking and/or loading new software on behalf of the adaptive terminal. By coordinating with the external processing device, such as a laptop computer, the processing power and storage requirements of the adaptive terminal can be dimensioned for a single mode of operation (or for multiple simultaneous modes if required). External processing devices such as contemporary laptop computers typically have far more powerful microprocessors and considerably more memory than contemporary mobile handheld terminals. The external processing device will therefore contain the processing and storage capabilities for the required compilation, linking and loading functionality. For example, the software may be stored by the external processing device in its compiled form ready for linking and loading. The external processing device will be capable of pre-storing more modes of mobile terminal operation than would be possible in reduced memory of the adaptive terminal.

As has already been mentioned, the external processing device can pre-store different operating modes on behalf of the adaptive terminal. The software for these modes can be received via a radio resource accessible to the adaptive terminal or may be received via a modem and cable interface embedded within the external processing device. When the software is accessed via the modem and cable interface, it might for operational reasons be appropriate for the external processing device to access the software prior to arrival in the region, country or locality where the wanted mode of adaptive terminal operation will be used. Preloading the software into the external processing device may be necessary where cable access to the source information is not available or accessible to the external processing device in that location. This approach of pre-loading the source software onto the external processing device may also apply when the source information for the new adaptive terminal mode is delivered via a radio resource which is not universally available.

For example if a traveller knows that he is going to travel from Europe to the US, he would pre-load the US PCS 1900 mode of operation onto his laptop via the existing GSM 900 mode. Before arriving in the US, the traveller would instruct his laptop computer to compile the PCS1900 source code. Upon arriving in the US, the traveller would instruct the external processing device to remove the GSM 900 software from the adaptive terminal and store that software (e.g. on disk). The traveller would then instruct the external processing device to link the PCS 1900 software and load it into the adaptive terminal. Upon his return to Europe, the user would use a similar approach to restore the GSM mode of operation.

Figure 4:
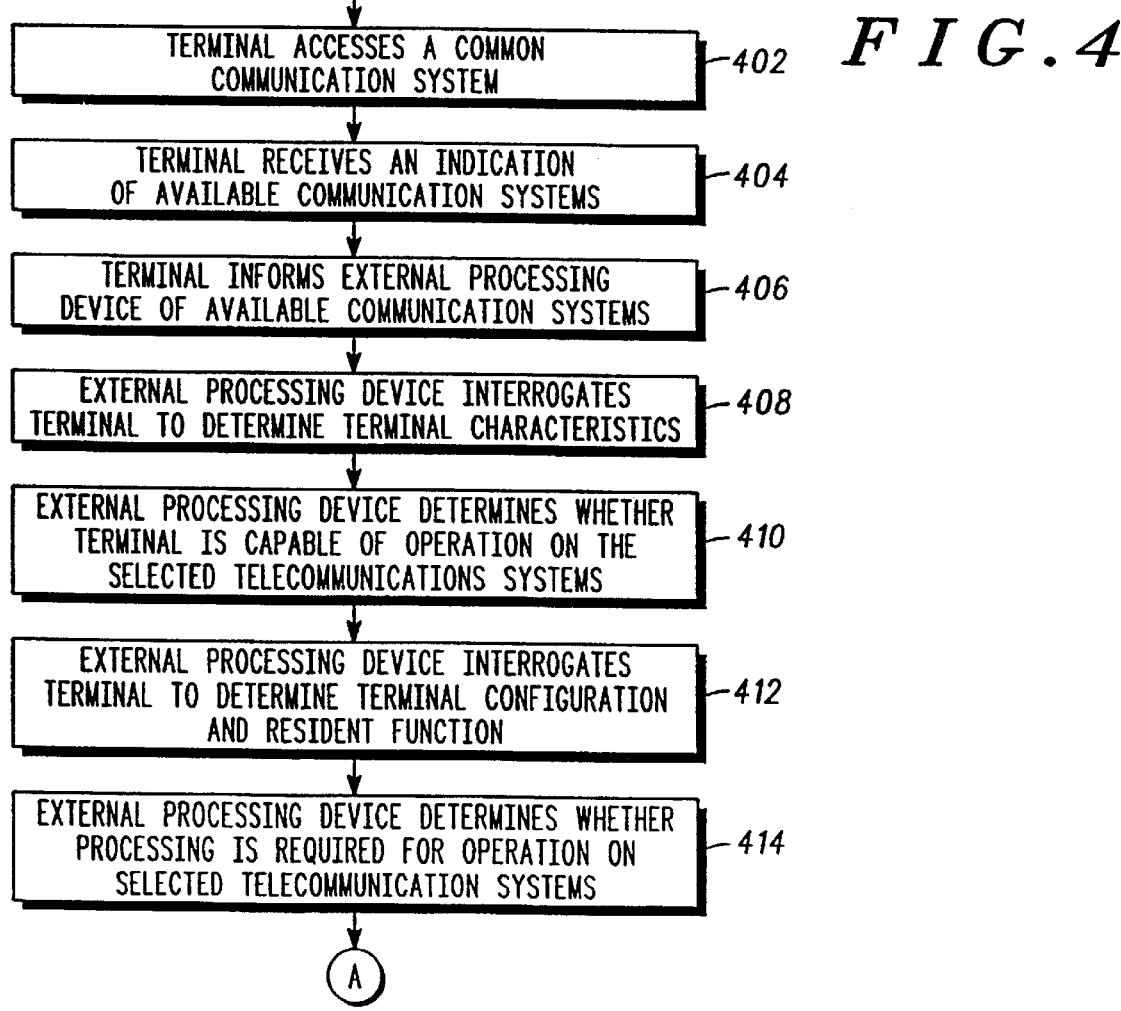
FIG. 4 is a flow chart showing the preferred steps for accessing a communication system according to the embodiment of FIG. 1.

Turning now to FIG. 4, the preferred steps for determining whether a terminal is compatible with a particular system are shown. At a step 402, the terminal accesses a common communication system. The terminal then receives an indication of available communication systems at a step 404, and informs the external processing device of the available communication systems at a step 406. The external processing device interrogates the terminal to determine the terminal characteristics, for example tuning range, channel bandwidth limitations and maximum transmit power, at a step 408. The external processing device then determines whether the terminal is capable of operation on the selected telecommunication system, at a step 410, by comparing the terminal characteristics determined in step 408 with the requirements of the selected telecommunications system, and interrogates the terminal which provides the external processing device with information about the terminal configuration and resident functions of the terminal, at a step 412. Finally, the external processing device determines whether programming is required for operation on the selected telecommunication system, at a step 414, by identifying which additional functions are required beyond those already present in the terminal, as previously determined in step 412.

Figure 5:
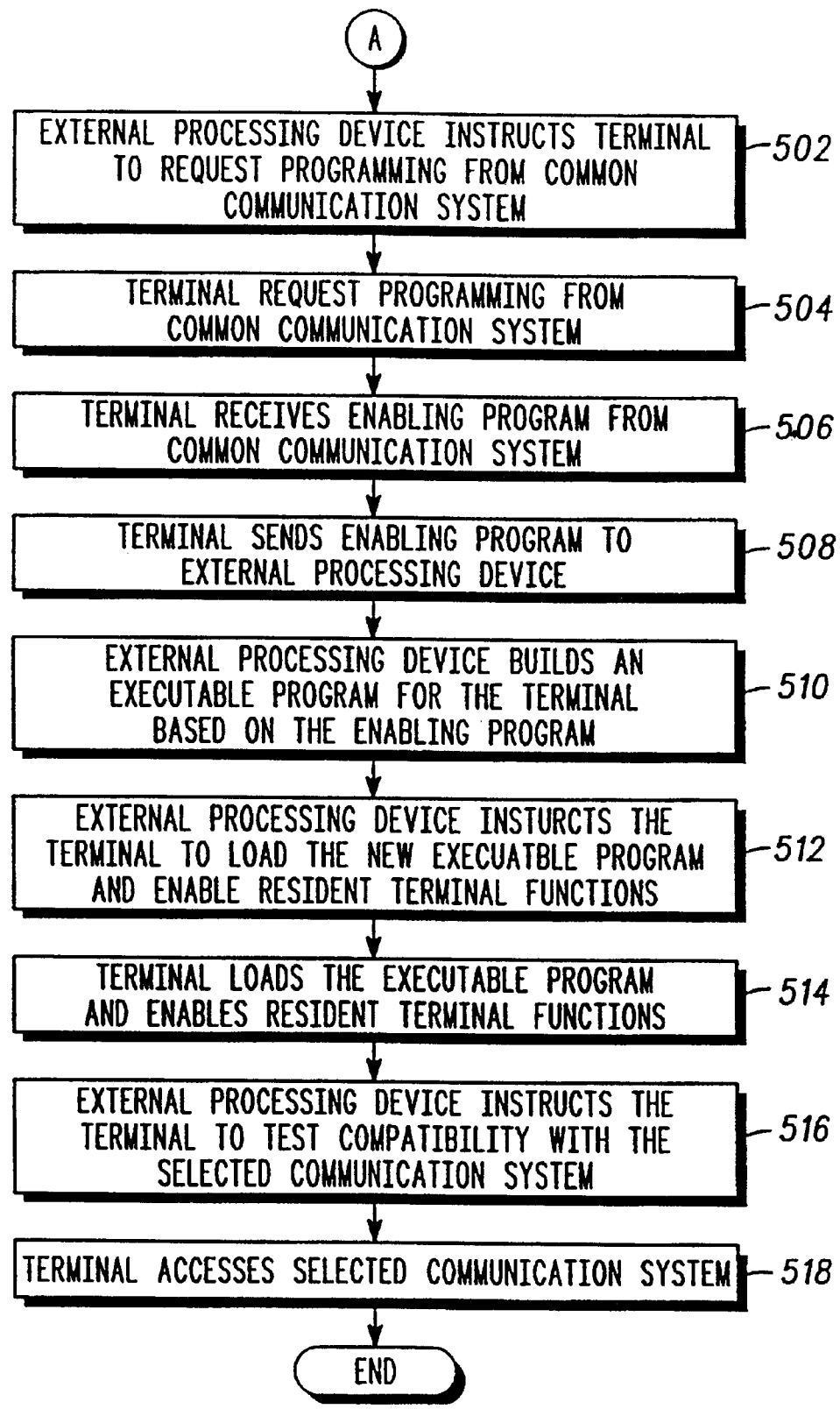
FIG. 5 is a block diagram of a communication network according to an alternate embodiment of the present invention.

Turning now to FIG. 5, the preferred steps for accessing a selected communication system are shown. At a step 502, the external processing device instructs the terminal to request programming from the common communication system. The terminal then requests programming from the common communication system at a step 504, and receives the enabling programme at a step 506. The terminal then sends the enabling programme to the external processing device at a step 508. The external processing device builds an executable programme for the terminal based upon the enabling programme at a step 510. The external processing device instructs the terminal to load the new executable programme and enable resident terminal functions at a step 512. The terminal loads the executable programme and enables the resident terminal functions at a step 514. The external processing device then instructs the terminal to test the capability with the selected communication system at a step 516, allowing the terminal to access the selected communication system at a step 518.

Figure 6:
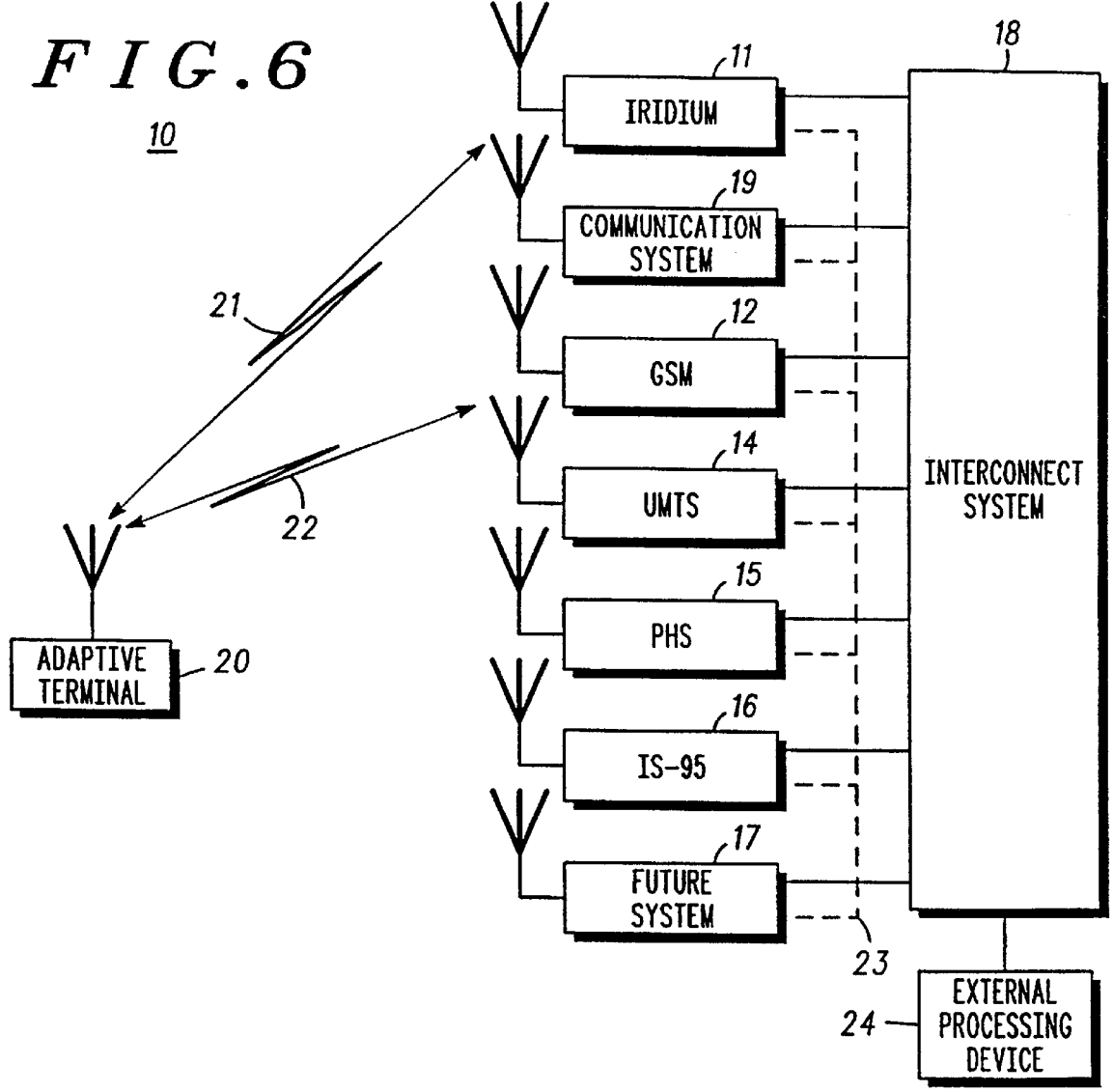
FIG. 6 is a block diagram of an alternate embodiment of a communication network according to the present invention.
Figure 7:
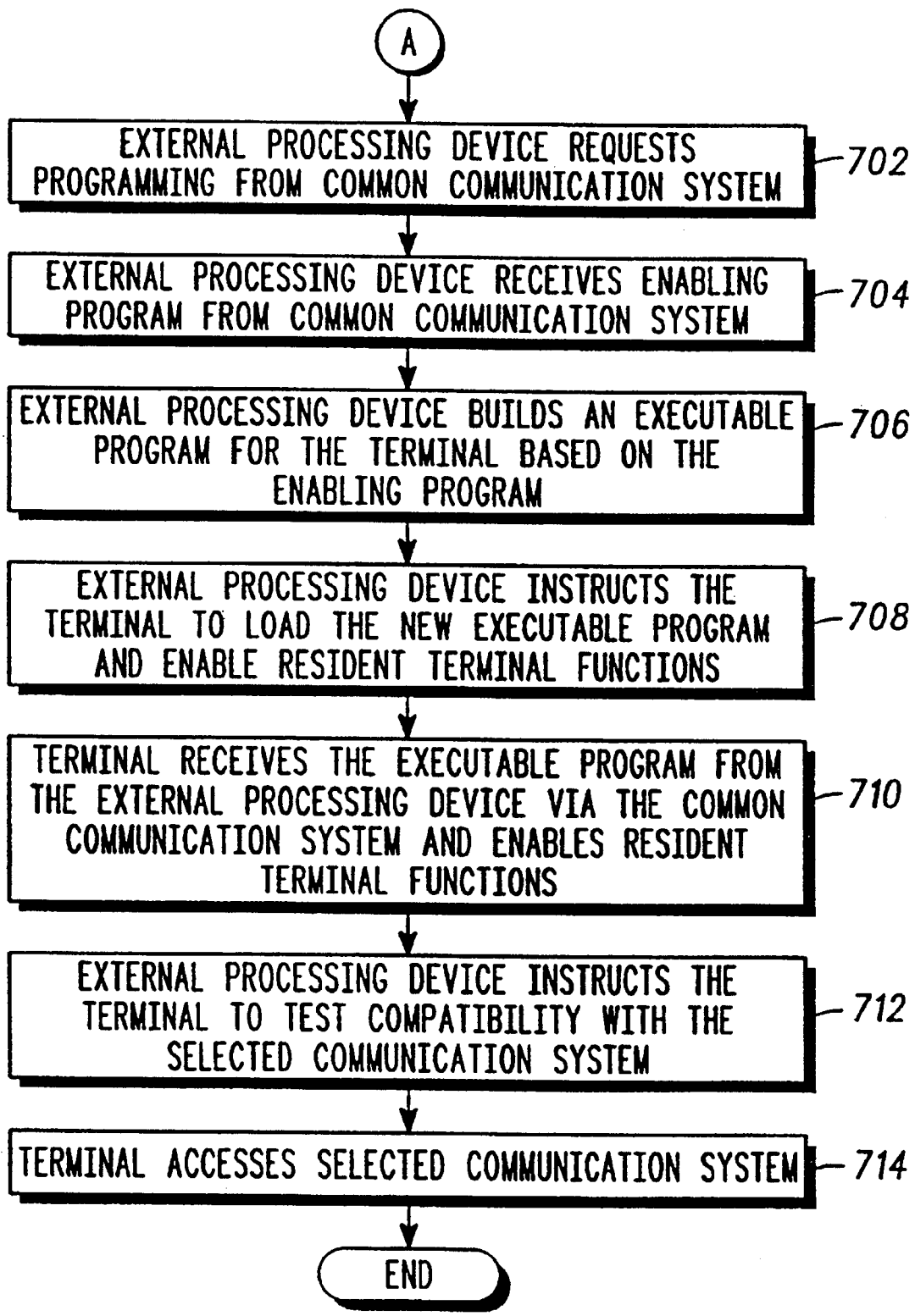
FIG. 7 is a flow chart showing the preferred steps for accessing a communication system according to an alternate embodiment of the present invention.

Turning now to FIG. 6, an alternative embodiment of the communication network according to the present invention is shown. Rather than coupling the external processing device 24 to the adaptive terminal, the external processing device is coupled to the inter-connection system 18 to compile and/or link software to the adaptive terminal. The preferred steps for compiling or linking software according to the embodiment of FIG. 6 are shown in FIG. 7. In particular, the external processing device requests programming from the common communication system at a step 702. The external processing device receives the enabling programme from the common communication system at a step 704, and builds an executable programme for the terminal based upon the enabling programme at a step 706. The external processing device then instructs the terminal to load the new executable programme and enable resident terminal functions at a step 708. According to the embodiment of FIG. 6., the external processing device instructs adaptive terminal 20 by way of interconnect system 18 and communication system 19 or some other communication system. The terminal then receives the executable programme from the external processing device via the common communication system and enables the resident terminal functions at a step 710. The external processing device then instructs the terminal to test compatibility with a selected communication system at a step 712. The terminal then accesses the selective communication system at a step 714. Alternatively, the steps of FIG. 7 could be performed for the embodiment of FIG. 1 where the external processing device accesses the interconnect system by way of the interface 305 to the network.

While the specific implementations of the present invention are described above, variations and modifications could be made by one skilled in the art within the spirit and scope of the present invention. The present invention should be limited only by the appended claims.

What is claimed is:

1. A method of enabling a subscriber unit to communicate with a selected communication system, said method characterized by the steps of:

accessing a common communication system;

receiving an indication of any communication systems available in a geographic region associated with said common communication system;

requesting access to said selected communication system of said communication systems;

receiving an enabling program for said selected communication system; transferring said enabling program to an external processing device which is remote from the subscriber unit;

configuring said subscriber unit to operate in accordance with a protocol of said selected communication system, said configuring being derived in accordance with said enabling program in said external processing device; and communicating with said selected communication system using said subscriber terminal disconnected from said external processing device.

2. A method of enabling a subscriber unit of claim 1, further characterized by the step of compiling said enabling program at said external processing device.

3. A method of enabling a subscriber unit of claim 1, further characterized by the step of loading said enabled program compiled at said external processing device in said subscriber unit.

4. A method of enabling a subscriber unit of claim 1, further characterized by the step of linking said enabling program to a program resident on said subscriber unit.

5. A method of enabling a subscriber unit of claim 1, further characterized by the step of testing the compliance of said subscriber unit with the requirements of said selected communication system prior to the step of accessing said selected communication system.

6. A method of enabling a subscriber unit of claim 1, prior to the step of receiving said enabling program, further characterized by the steps of:

transferring information characterising the selected communication system to said subscriber unit;

transferring said information from said subscriber unit to said external processing device;

determining if programming of said subscriber unit to operate on said selected communication system is required; and requesting said programming from said common communication system.

7. A method of enabling a subscriber unit of claim 1, wherein said step of receiving said enabling program consists of at least one of the following steps:

enabling an existing resident function within said subscriber unit; and downloading a non-resident program to said subscriber unit.

8. A method of enabling a subscriber unit of claim 7, wherein said non-resident program comprises at least one of:

a high level design specification; and a specification which can be executed directly as a function by said mobile.

9. A subscriber unit adaptable to operate on a system having a common communication system comprising:

a receiver for receiving an enabling program from said common communication system;

a processing circuit coupled to said receiver to receive said enabling program;

a memory coupled to said processing circuit for storing said enabling program;

a control circuit coupled to said processing circuit for controlling said subscriber unit; and an interface circuit for transferring said enabling program to an external processing device remote from the subscriber unit and receiving a complied program from said external processing device, wherein said subscriber unit is operable to communicate with said common communication system using said compiled program when disconnected from said external processing device.

* * * * *